Nov. 17, 1964     O. K. KELLEY     3,157,394

VEHICLE SUSPENSION MECHANISM

Filed Oct. 31, 1962     3 Sheets—Sheet 1

INVENTOR.
Oliver K. Kelley
BY
Paul J. Reising
ATTORNEY

United States Patent Office 3,157,394
Patented Nov. 17, 1964

3,157,394
VEHICLE SUSPENSION MECHANISM
Oliver K. Kelley, Bloomfield Hills, Mich., assignor to General Motors Corporation, Detroit, Mich., a corporation of Delaware
Filed Oct. 31, 1962, Ser. No. 234,438
15 Claims. (Cl. 267—15)

This invention relates to a spring suspension mechanism for preventing excessive forces from being transmitted from the road wheels to the body of a vehicle while the latter traverses irregular terrain.

Some forms of track-laying vehicles of the commercial and military type have a plurality of spring suspension mechanisms each of which includes a trailing support arm that rotatably mounts a track-engaging wheel at one end and is pivotally supported to the vehicle frame at the other end for movement about a transverse axis. These mechanisms are located between the idler wheel and drive sprocket with the result that as the vehicle traverses irregular terrain, the wheels rise and fall causing oscillatory movement of the associated support arm which in turn acts against a spring device that serves to absorb the forces caused by such movement.

This invention is directed to an improved spring suspension mechanism of the above-described type comprising a housing that is fixed to the vehicle body and has means for pivotally supporting one end of a suspension arm, the other end of which rotatably supports a wheel. A plurality of variable rate spring means are positioned in the housing together with a cooperating cam arrangement that includes driving and driven cam members which are operatively associated with the suspension arm so that upon pivotal movement of the latter in one direction, the spring is loaded by the cam arrangement to absorb the forces imposed by such movement. Anti-friction means are provided between the cam members, and in order to minimize friction one of the cam members is characterized by having a reduced cam surface contact area. In a modified form of the invention, a pair of independent suspension arms are pivotally supported in the housing and means are provided for permitting each of the arms to impose a load on a common spring means through a cam arrangement of the type mentioned above.

Figure 1:
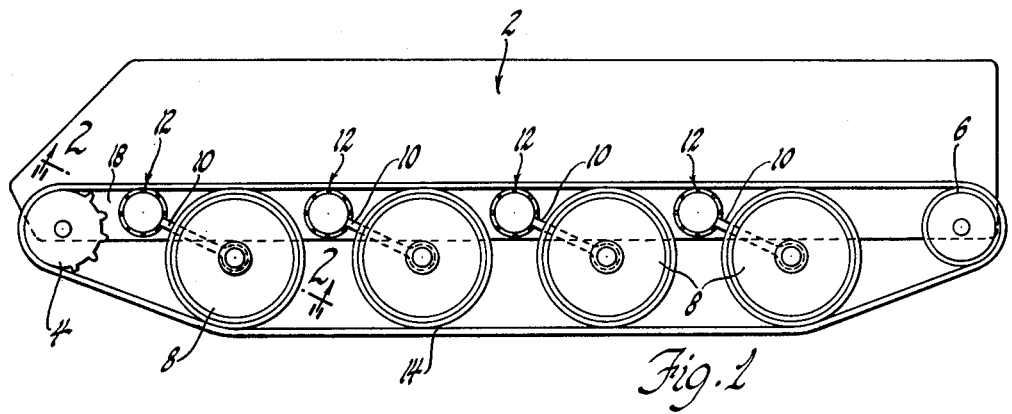
Figure 3:
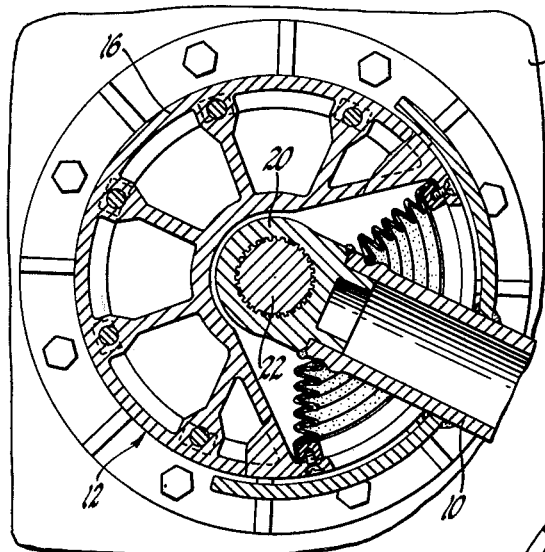
Figure 4:
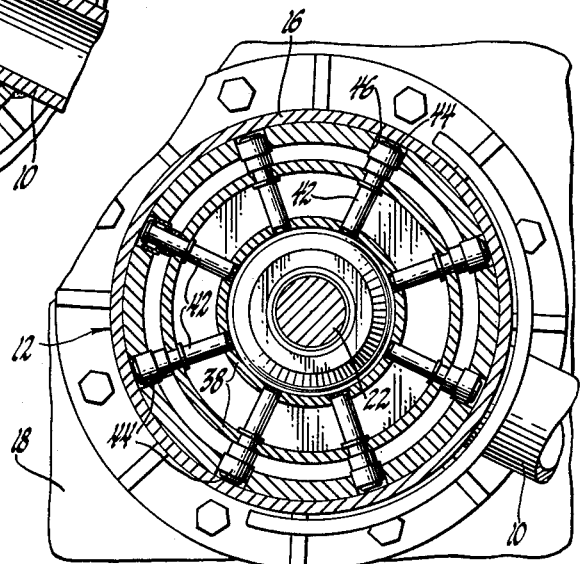
Figure 5:
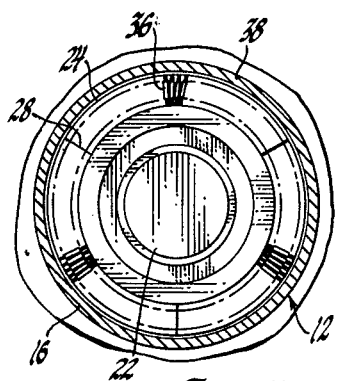
Figure 6:
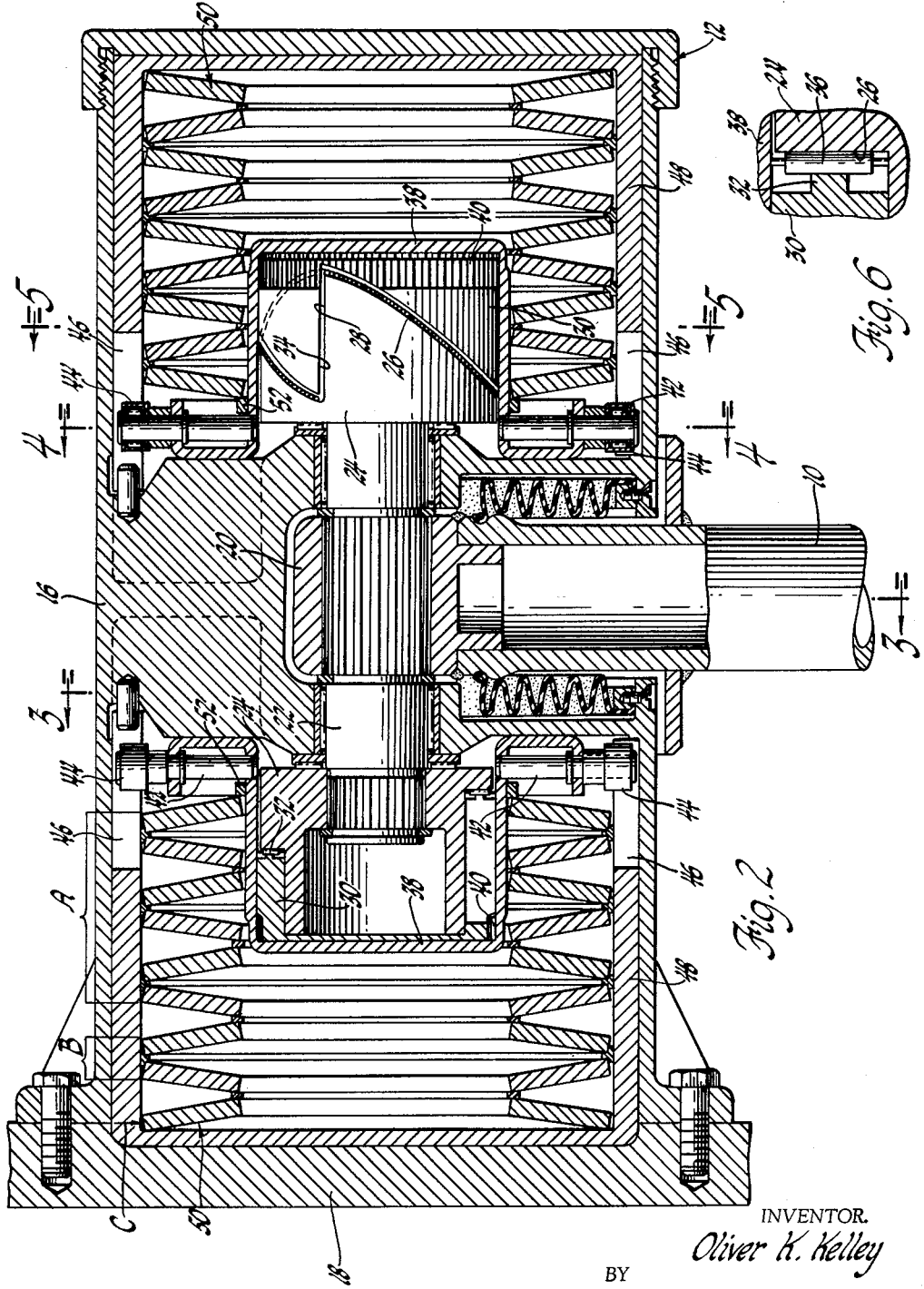
Figure 7:
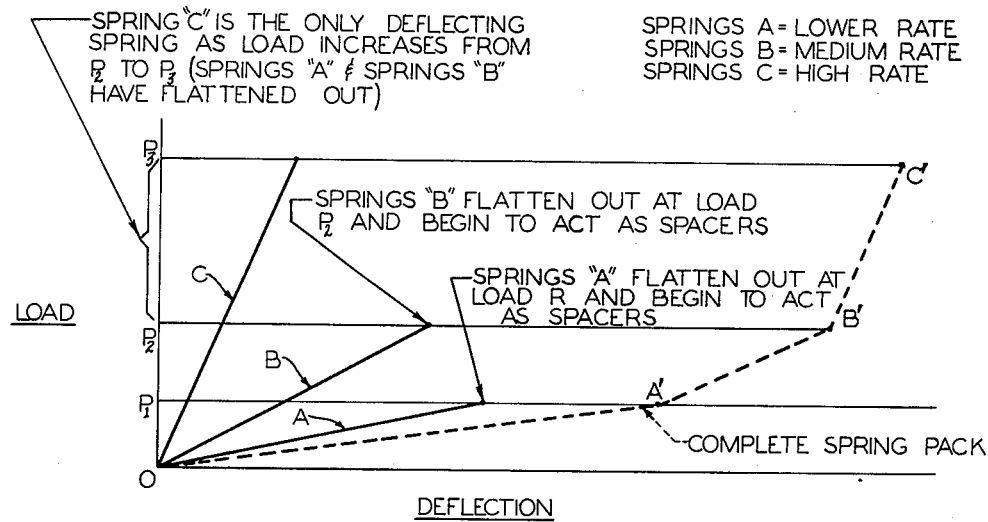
Figure 8:
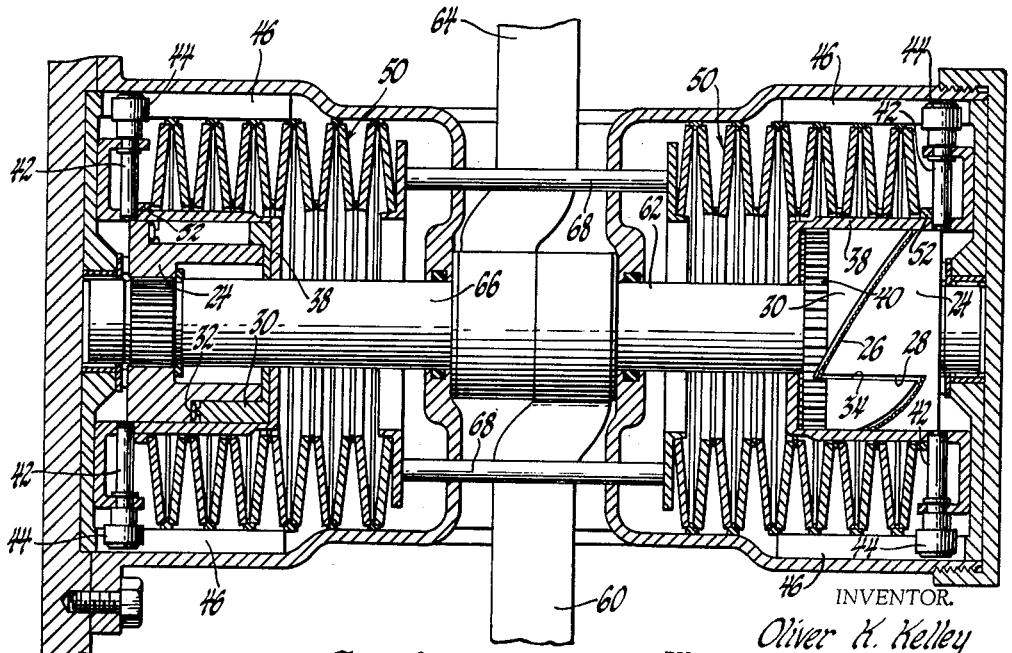

A more complete understanding of the invention can be derived from the following detailed description of the invention with reference to the drawings in which:

FIGURE 1 is an elevation view showing a track-laying vehicle employing the present invention, FIGURE 2 is an enlarged view of the section taken on line 2—2 of FIGURE 1, FIGURE 3 is a view taken on line 3—3 of FIGURE 2, FIGURE 4 is a view taken on line 4—4 of FIGURE 2, FIGURE 5 is a view taken on line 5—5 of FIGURE 2, FIGURE 6 is an enlarged fragmentary view of a portion of FIGURE 2 and illustrating the relative areas of the cam contact surfaces, FIGURE 7 graphically illustrates the deflection of the springs under different loads, and FIGURE 8 shows a modified construction of the invention in which a pair of independent suspension arms are used.

Referring now to FIGURE 1, for illustrative purposes a vehicle 2 is shown which includes a front drive sprocket 4, a rear idler wheel 6 and a plurality of road wheels 8 therebetween. Each road wheel is rotatably supported on the free end of a suspension arm 10 which extends into a spring suspension mechanism made in accordance with the invention and indicated generally at 12. An endless track 14 is entrained about the aforementioned wheels, and is adapted to be driven by the power train of the vehicle connected to drive sprocket 4. As will be apparent, the road wheels 8 act through the lower run of the track to support the vehicle on the ground.

As best seen in FIGURE 2, the spring suspension mechanism 12 includes a cylindrical housing 16 having one end rigidly secured to the side wall 18 of the vehicle frame. The suspension arm 10 includes a hub 20 splined or otherwise non-rotatably secured to a short shaft 22 pivotally mounted concentrically within the housing 16. A driving cam 24 is secured to each end of the shaft 22, and each cam includes a series of curved cam surfaces 26 and stop surfaces 28. A driven cam 30 is piloted on each of the driving cams 24 and includes a cam surface 32 in the form of a narrow continuous shoulder and a stop surface 34 complementary to the corresponding surfaces of the driving cams. An enlarged view of the cam surface 32 is shown in FIGURE 6 together with one of the needle bearings 36 disposed between and engaging the cam surfaces 26 and 32. The needle bearing construction between the cams is of particular significance in that it serves to minimize the friction between the engaging surfaces of the driving and driven cams. In this regard, the friction loss in such a bearing for one rotation of the latter is a function of several variables including the load bearing area or surface of the bearing element itself. In this construction, one surface of the needle bearings 36 engages the relatively narrow shoulder 32 on the driven cam 30 which results in an effective force-transmitting area through the bearings just slightly greater than the width of such shoulder. Consequently, the friction loss due to each such needle bearing is minimized by keeping the load bearing area to a minimum, while a great number of needle bearings are used to provide a total bearing area sufficient to sustain the load.

Each of the driven cams are non-rotatably seated within a housing or cage 38 by means of a series of serrations 40 which bite into similar serrations on such housings. A plurality of radially projecting pins 42 extend from the housings 38 and the outer end of each pin is equipped with a roller bearing 44 which supports the pin in a slot 46 formed in cylindrical containers 48 secured to and within the housing 16. A pack of Belleville spring washers 50 are mounted within each container 48, and extend from the base thereof to a shoulder or retaining ring 52 fixed to the housings 38. Preferably, the Belleville washers have variable spring rates; that is, those at "A" have a low spring rate, the washers "B" a medium spring rate and the washers "C" a high rate.

Referring now to the operation of this construction, it will first be noted that FIGURE 2 is a view looking up from beneath the suspension mechanism. When the vehicle is stationary on level ground the cage 38 will be located between the position shown and the end wall of housing 16, but for illustrative purposes it may be assumed that the assembly is disposed as shown in FIGURE 2 of the drawing. Now, as a road wheel rides up over an obstruction and forces are imposed thereon, the suspension arm 10 will swing counterclockwise in FIGURE 1 or into the plane of the paper in FIGURE 2. This motion causes the shaft 22 to oscillate and the cam surfaces 26 on the driving cams to drive the surfaces 32 of the driven cams through the needle bearings 36. As a result, the driven cams including their cages 38 and the pins 42 are caused to reciprocate axially away from the driving cams to load the packs of Belleville washers 50 in accordance with the load imposed on the road wheels. Since the spring washers have variable rates, they combine to provide a much safer ride than would be obtained from washers having the same spring rate. The load-deflection graph shown in FIGURE 7 indicates how individual washers "A," "B" and "C" would perform if alone in the spring pack. The dotted line indicates how they perform in conjunction with each other. Thus, for low loads up to P–1, all washers act to give the curve O–A'. Washers "A" collapse at point A' and then act merely as spacers, the load up to P–2, being taken by washers "B" and "C" along curve A'–B'. Washers "B" collapse at B' and loads up to P–3 are taken solely by washers "C." As soon as the road wheel passes the aforementioned obstacle or the force imposed thereon is otherwise removed, the spring packs re-expand causing respective engagement between the cam surfaces of the driven and driving cams to return the suspension arm and road wheel to its normal position. In this regard, stop surfaces 28 and 34 limit downward movement of the suspension arm; i.e., act as rebound stops.

FIGURE 8 shows a modified construction of the above-described mechanism in which the assembly mounts two suspension arms for two adjacent wheels rather than one arm as in the first embodiment. Parts corresponding to those found in the first embodiment have been given the same reference numerals in this modification inasmuch as this construction is substantially identical except that the suspension arm 60 is secured to one shaft 62 while the suspension arm 64 is secured to a separate and axially aligned shaft 66. The respective shafts extend into housing containing stacks of Belleville washers 50 which are operated by cam constructions as previously described. However, the inner ends of each Belleville stack are interconnected by a plurality of rods 68 circumferentially spaced about the axis of the shafts 62 and 66. Thus, if one arm moves while the other is stationary, such movement is resisted by both packs of washers. Most significantly, if arm 60 rises and arm 64 falls as when one wheel is riding up an obstruction and the other is riding down it to an equal degree, no forces are transmitted to the vehicle. In other words, as the spring pack of the rising wheel compresses, that of the other wheel expands accordingly. The above occurs, of course, due to the ability of the cam drivers 24 to cause the cam followers 30 and the associated cage 38 to be shifted towards and away from the hub portions of the suspension arms 60, 64. Moreover, it should be apparent that with this arrangement, a single suspension mechanism can serve two wheels and still provide the necessary spring force for cushioning each wheel should it ride over an obstacle. For a vehicle of the type shown in FIGURE 1, only two of the modified construction would be required; one for the pair of wheels closest to the sprocket 4, and the other for the pair of wheels nearest to the idler wheel 6.

Various changes and modifications can be made in the above-described mechanisms without departing from the spirit of the invention. Such changes and modifications are contemplated by the inventor and it should be understood that he does not wish to be limited except by the scope of the appended claims.

What is claimed is:
1. A suspension mechanism for a vehicle having a plurality of ground-engaging wheels, said mechanism comprising a housing fixed to the vehicle, a spring disposed in the housing, a suspension arm having one end thereof pivotally supported by the housing on an axis parallel to the longitudinal axis of the housing, the other end of the suspension arm rotatably supporting one of said wheels, an annular cam driver member fixed to said suspension arm and having a plurality of curved surfaces connected by circumferentially spaced axially extending straight surfaces, an annular cam follower member having surfaces complementary to the surfaces of the cam driver for engagement therewith, the surfaces of one of said cam members having a contact area substantially less than that provided by said curved and straight surfaces of the other of said members, a plurality of needle bearings interposed between the curved surfaces of the cam driver and follower, a cage supported for axial movement by the housing, said cam follower non-rotatably mounted in said cage, a portion of said cage engaging said springs so that upon pivotal movement of the suspension arm in one direction the cooperating cam surfaces cause the cage to be shifted to load the spring.

2. A suspension mechanism for a vehicle having a plurality of ground-engaging wheels, said mechanism comprising a cylindrical housing fixed to the vehicle, a spring disposed in the housing, a shaft rotatably supported by the housing on an axis parallel to longitudinal axis of the housing, a suspension arm having one end thereof rigidly connected to the shaft on a transverse axis, the other end of the suspension arm rotatably supporting one of said wheels, an annular cam driver fixed to said shaft and having a plurality of curved surfaces connected by circumferentially spaced axial extending straight surfaces, an annular cam follower having surfaces complementary to the surfaces of the cam driver for engagement therewith and having a surface contact area substantially less than that provided by said curved and straight surfaces of said cam driver, anti-friction means interposed between the curved surfaces of the cam driver and follower, a cage supported for axial movement by the housing, said cam follower non-rotatably mounted in said cage, a portion of said cage engaging said spring so that upon movement of the suspension arm in one direction about the shaft axis the cooperating cam surfaces cause the cage to be shifted to load the spring.

3. A suspension mechanism for a vehicle having a plurality of ground-engaging wheels, said mechanism comprising a cylindrical housing fixed to the vehicle, a pack of variable rate springs disposed in the housing, a shaft rotatably supported by the housing, a suspension arm having one end thereof rigidly connected to the shaft, the other end of the suspension arm rotatably supporting one of said wheels, an annular cam driver fixed to said shaft and having a plurality of curved surfaces connected by circumferentially spaced axially extending straight surfaces, an annular cam follower having surfaces complementary to the surfaces of the cam driver for engagement therewith and having a surface contact area substantially less than that provided by said curved and straight surfaces of said cam driver, anti-friction means interposed between the curved surfaces of the cam driver and follower, a cage supported for axial movement by the housing, said cam follower non-rotatably mounted in said cage, a portion of said cage engaging said springs so that upon movement of the suspension arm in one direction about the shaft axis the cooperating cam surfaces cause the cage to be shifted to load the spring pack.

4. A suspension mechanism for a track-laying vehicle having a plurality of track-engaging wheels, said mechanism comprising a cylindrical housing fixed to the vehicle, a pack of variable rate Belleville springs disposed in the housing, a shaft rotatably supported by the housing on an axis parallel to the longitudinal axis of the housing, a suspension arm having one end thereof rigidly connected to the shaft on a transverse axis, the other end of the suspension arm rotatably supporting one of said wheels on an axis parallel to said longitudinal axis of the housing, an annular cam driver fixed to said shaft and having a plurality of curved surfaces connected by circumferentially spaced axially extending straight surfaces, an annular cam follower having surfaces complementary to the surfaces of the cam driver for engagement therewith and having a surface contact area substantially less than that provided by said curved and straight surfaces of said cam driver, a plurality of needle bearings interposed between the curved surfaces of the cam driver and follower, a cage supported for axial movement by the housing, said cam follower non-rotatably mounted in said cage, a portion of said cage engaging said springs so that upon movement of the suspension arm in one direction about the shaft axis the cooperating cam surfaces cause the cage to the shifted to load the spring pack.

5. A suspension mechanism for a vehicle having a plurality of ground-engaging wheels, comprising a housing fixed to the vehicle, first and second spring means, a pair of spaced chambers formed in the housing for separately supporting the respective spring means, means connecting the first and second spring means, first and second suspension arms supported for pivotal movement by the housing, means operatively associating one end of each suspension arm with one of said spring means so that independent pivotal movement of either of the suspension arms is effective to load the first and second spring means.

6. A suspension mechanism for a vehicle having a plurality of ground-engaging wheels, said mechanism comprising a housing fixed to the vehicle, first and second springs disposed in the housing, first and second suspension arms having one end of each independently pivotally supported by the housing about an axis parallel to the longitudinal axis of the housing, the other end of each arm rotatably supporting one of said wheels, first means rigid with said one end of each suspension arm and movable therewith in response to pivotal movement of the latter, second means operatively associated with each of said first means and slidably supported by the housing, said first and second springs associated with the second means of the first and second suspension arms respectively so as to normally urge the second means into engagement with the first means, and third means connecting the first and second springs so that independent pivotal movement of either of said suspension arms is effective to load both of said springs.

7. A suspension mechanism for a vehicle having a plurality of ground-engaging wheels, said mechanism comprising a housing fixed to the vehicle, first and second springs disposed in the housing, first and second suspension arms having one end of each independently pivotally supported by the housing about an axis parallel to the longitudinal axis of the housing, the other end of each arm rotatably supporting one of said wheels, a cam driver rigid with said one end of each suspension arm, a cam follower operatively associated with each cam driver and slidably supported by the housing, said first and second springs associated with the cam follower of the first and second suspension arms respectively so as to normally urge the cam follower into engagement with the associated cam driver, and means connecting the first and second springs so that independent pivotal movement of either of said suspension arms is effective to load both of said springs.

8. A suspension mechanism for a vehicle having a plurality of ground-engaging wheels, said mechanism comprising a housing fixed to the vehicle, first and second springs disposed in the housing, first and second suspension arms having one end of each independently pivotally supported by the housing about an axis parallel to the longitudinal axis of the housing, the other end of each arm rotatably supporting one of said wheels, a cam driver rigid with said one end of each suspension arm, a cam follower operatively associated with each cam driver and slidably supported by the housing, anti-friction means interposed between each cam driver and follower, said first and second springs associated with the cam follower of the first and second suspension arms respectively so as to normally urge the cam follower into engagement with the associated cam driver, and means connecting the first and second spring so that independent pivotal movement of either of said suspension arms is effective to load both of said springs.

9. A suspension mechanism for a vehicle having a plurality of ground-engaging wheels, said mechanism comprising a housing fixed to the vehicle, first and second springs disposed in the housing, first and second chambers formed in the housing for separately supporting the respective springs, first and second suspension arms having one end of each independently pivotally supported in the housing, the other end of each arm rotatably supporting one of said wheels, a cam driver rigid with said one end of each suspension arm, a cam follower operatively associated with each cam driver and slidably supported by the housing, said first and second springs associated with the cam follower of the first and second suspension arms respectively so as to normally urge the cam follower into engagement with the adjacent cam driver, and means connecting the springs so that independent pivotal movement of either of said suspension arms is effective to load both of said springs.

10. A suspension mechanism for a vehicle having a plurality of ground-engaging wheels, said mechanism comprising a cylindrical housing fixed to the vehicle, first and second chambers formed in the housing, a Belleville spring pack disposed in the respective chambers, a rotatable shaft supported in each of the chambers on an axis parallel to the longitudinal axis of the housing, a suspension arm fixed at one end to each shaft, the free end of each arm rotatably supporting a wheel, a cam driver rigidly mounted to each shaft, a cam follower engaging each cam driver, anti-friction means interposed between the cam driver and follower, a cage slidably supported for axial movement in each chamber and non-rotatably supporting the associated cam follower, said cage having a portion engaging the associated spring pack, means interconnecting the spring packs of the first and second chambers, said last-mentioned means permitting independent pivotal movement of either of said suspension arms to effectively load both of said spring packs.

11. A suspension mechanism for a vehicle having a plurality of ground-engaging wheels, said mechanism comprising a cylindrical housing fixed to the vehicle, first and second chambers formed in the housing, a pack of variable rate Belleville springs disposed in the respective chambers, a rotatable shaft supported in each of the chambers on an axis parallel to the longitudinal axis of the housing, a suspension arm fixed at one end to each shaft, the free end of each arm rotatably supporting a wheel, an annular cam driver rigidly mounted to each shaft, an annular cam follower engaging each cam driver, a plurality of needle bearings interposed between the cam driver and follower, a cage slidably supported for axial movement in each chamber and non-rotatably supporting the associated cam follower, said cage having a portion engaging the associated spring pack, a plurality of shiftable members radially spaced from said shafts and interconnecting the spring packs of the first and second chambers, said shiftable members permitting independent pivotal movement of either of said suspension arms to effectively load both of said spring packs.

12. A suspension mechanism for a track-laying vehicle having a plurality of ground-engaging wheels, said mechanism comprising a cylindrical housing fixed to the vehicle, first and second spaced chambers formed in the housing, a Belleville spring pack disposed in the respective chambers, a rotatable shaft supported in each of the chambers on a common axis parallel to the longitudinal axis of the housing, a suspension arm fixed at one end to each shaft, the free end of each arm rotatably supporting a wheel, a cam driver rigidly mounted to the shaft, a cam follower engaging each cam driver, a plurality of needle bearings interposed between each cam driver and follower, a cage including a plurality of projections slidably supported for axial movement in each chamber, said cage non-rotatably supporting the associated cam follower and having a portion engaging the associated spring pack, a plurality of shiftable members radially spaced from said shafts and interconnecting the spring packs of the first and second chambers, said shiftable members permitting independent pivotal movement of either of said suspension arms to effectively load both of said spring packs.

13. A suspension mechanism for a track-laying vehicle having a plurality of ground-engaging wheels, said mechanism comprising a cylindrical housing fixed to the vehicle, first and second spaced chambers formed in the housing, a Belleville spring pack disposed in the respective chambers, a rotatable shaft supported in each of the chambers on a common axis parallel to the longitudinal axis of the housing, a suspension arm fixed at one end to each shaft, the free end of each arm rotatably supporting a wheel, a cam driver member rigidly mounted to the shaft and having a plurality of curved surfaces, a cam follower member engaging each cam driver and having surfaces complementary to the surfaces of the cam driver, a plurality of needle bearings interposed between the cam driver and follower, a cage slidably supported for axial movement in each chamber and non-rotatably supporting the associated cam follower, said cage having a portion engaging the associated spring pack, a plurality of shiftable members radially spaced from said shafts and interconnecting the spring packs of the first and second chambers, said shiftable members permitting independent pivotal movement of either of said suspension arms to effectively load both of said spring packs.

14. The mechanism of claim 13 wherein the surfaces formed on the one of said cam members has a bearing contact area substantially less than that of the complementary surface formed on the other of said cam members.

15. The mechanism of claim 13 wherein the cam members include cooperating surfaces for limiting pivotal movement of the suspension arm in one direction.

References Cited in the file of this patent
UNITED STATES PATENTS

| | | |
|---|---|---|
| 1,619,035 | Rafter | Mar. 1, 1927 |
| 1,751,890 | Seymour | Mar. 25, 1930 |
| 1,964,735 | Knox et al. | July 3, 1934 |
| 1,991,911 | Riley | Feb. 19, 1935 |
| 2,093,456 | Knox | Sept. 21, 1937 |
| 2,162,198 | Herrington | June 13, 1939 |

FOREIGN PATENTS

| | | |
|---|---|---|
| 26,709 | France | Nov. 6, 1923 |
| 762,460 | France | Jan. 22, 1934 |